US012005813B2

United States Patent
Zhao et al.

(10) Patent No.: US 12,005,813 B2
(45) Date of Patent: Jun. 11, 2024

(54) LONG RAIL ASSEMBLY WITH TRIPLE RAIL CONFIGURATION

(71) Applicant: Magna Seating Inc., Aurora (CA)

(72) Inventors: Kai Zhao, Novi, MI (US); Cheikh Dioum, Farmington Hills, MI (US)

(73) Assignee: Magna Seating Inc., Aurora (CA)

( * ) Notice: Subject to any disclaimer, the term of this patent is extended or adjusted under 35 U.S.C. 154(b) by 211 days.

(21) Appl. No.: 17/608,539

(22) PCT Filed: May 4, 2020

(86) PCT No.: PCT/US2020/031262
§ 371 (c)(1),
(2) Date: Nov. 3, 2021

(87) PCT Pub. No.: WO2020/227186
PCT Pub. Date: Nov. 12, 2020

(65) Prior Publication Data
US 2022/0219569 A1 Jul. 14, 2022

Related U.S. Application Data

(60) Provisional application No. 62/842,687, filed on May 3, 2019.

(51) Int. Cl.
*B60N 2/06* (2006.01)
*B60N 2/015* (2006.01)
(Continued)

(52) U.S. Cl.
CPC ..... *B60N 2/01591* (2013.01); *B60N 2/02246* (2023.08); *B60N 2/067* (2013.01);
(Continued)

(58) Field of Classification Search
CPC ........................ B60N 2/01591; B60N 2/02246; B60N 2/067; B60N 2/07; B60N 2/0875;
(Continued)

(56) References Cited

U.S. PATENT DOCUMENTS

| 2,660,223 | A | 4/1951 | Appleton | |
| 6,293,622 | B1 * | 9/2001 | Horisawa | B60N 2/0715 296/65.01 |

(Continued)

FOREIGN PATENT DOCUMENTS

| EP | 2301792 | 3/2011 |
| FR | 2728860 | 7/1996 |

(Continued)

*Primary Examiner* — Nkeisha Smith
(74) *Attorney, Agent, or Firm* — Miller Canfield

(57) ABSTRACT

A long rail assembly for repositioning a seat assembly in a vehicle comprising an inboard lower channel, an inboard manual drive assembly, an outboard lower channel, an outboard manual drive assembly, a central lower channel, and a power drive assembly. The inboard lower channel is adapted to extend longitudinally along a floor of the vehicle. The inboard manual drive assembly is coupled to the seat assembly and slidably coupled to the inboard lower channel. The outboard lower channel is adapted to extend longitudinally along the floor of the vehicle. The outboard manual drive assembly is coupled to the seat assembly and slidably coupled to the outboard lower channel. The central lower channel is adapted to extend longitudinally along the floor of the vehicle. The power C drive assembly is coupled to the seat assembly and slidably coupled to the central lower channel. The power drive assembly power drives the seat assembly along the central lower channel.

16 Claims, 7 Drawing Sheets

(51) Int. Cl.
*B60N 2/02* (2006.01)
*B60N 2/07* (2006.01)
*B60N 2/08* (2006.01)

(52) U.S. Cl.
CPC ............ *B60N 2/07* (2013.01); *B60N 2/0875* (2013.01); *B60N 2/0887* (2013.01)

(58) Field of Classification Search
CPC ...... B60N 2/0887; B60N 2/36; B60N 2/0232; A47C 7/62; A47C 7/5064; A47C 1/0242; A47C 1/025; A47C 3/20; A61G 5/128; A61G 5/04; A61G 5/1059; A61G 5/1067; A61G 2200/34
USPC ........................................................ 248/429
See application file for complete search history.

(56) References Cited

U.S. PATENT DOCUMENTS

| | | | |
|---|---|---|---|
| 6,691,971 B2 | 2/2004 | Yamada et al. | |
| 7,000,967 B2 * | 2/2006 | Oshima | B60N 2/067 296/65.01 |
| 7,331,558 B2 | 2/2008 | Jeong | |
| 7,452,019 B1 * | 11/2008 | Day | B60N 2/309 297/344.13 |
| 8,565,982 B2 * | 10/2013 | Lofstrand | F16M 11/20 280/35 |
| 8,844,891 B2 | 9/2014 | Yamada et al. | |
| 9,403,448 B1 * | 8/2016 | Evans | B60W 10/06 |
| 9,452,691 B2 * | 9/2016 | Löfstrand | B60N 2/02246 |
| 9,994,130 B2 * | 6/2018 | Michels | B60N 2/062 |
| 10,011,195 B2 | 7/2018 | Kume et al. | |
| 10,391,888 B2 * | 8/2019 | Nozaki | B60N 2/0825 |
| 11,679,694 B2 * | 6/2023 | Zhao | B60N 2/0875 248/429 |
| 2014/0138997 A1 * | 5/2014 | Schulz | B60N 2/07 297/344.24 |
| 2021/0354598 A1 * | 11/2021 | Xiao | B60N 2/067 |
| 2022/0016997 A1 * | 1/2022 | Zhang | B60N 2/067 |
| 2022/0161691 A1 * | 5/2022 | Zhao | B60N 2/07 |
| 2022/0371475 A1 * | 11/2022 | Dillinger | B60N 2/14 |
| 2023/0041032 A1 * | 2/2023 | Jung | B60N 2/02246 |
| 2023/0044679 A1 * | 2/2023 | Jung | B60N 2/68 |
| 2023/0052454 A1 * | 2/2023 | Moon | B60N 2/01583 |

FOREIGN PATENT DOCUMENTS

| | | |
|---|---|---|
| FR | 2916167 | 11/2008 |
| JP | 2006160178 | 6/2006 |

* cited by examiner

LONG RAIL ASSEMBLY WITH TRIPLE RAIL CONFIGURATION

CROSS-REFERENCE TO RELATED APPLICATIONS

This application claims priority to and all the benefits of U.S. Provisional Patent Application No. 62/842,687, filed May 3, 2019, and entitled "Long Rail Assembly with Triple Rail Configuration," the disclosure of which is hereby incorporated by reference in its entirety.

BACKGROUND OF THE INVENTION

1. Field of the Invention

The present invention relates to a long rail assembly that adjusts the position of a seat assembly within a vehicle.

2. Description of Related Art

Many vehicles today have systems that give seats the capability of power adjustment. For example, adjustable seat assemblies in vehicles incorporate various parts that take the mechanical energy generated by a motor and use it to move the seat. These systems often include multiple power drive assemblies that automatically drive the seat along tracks or channels in the vehicle floor. Often times there is a potential for synchronization issues between the multiple drive assemblies as well as a lack of strength and stability. Furthermore, the more mechanical and moving parts you have the higher risk there is for malfunction due to mechanical failure.

SUMMARY OF THE INVENTION

According to one embodiment, there is provided a long rail assembly for repositioning a seat assembly in a vehicle comprising an inboard lower channel, an inboard manual drive assembly, an outboard lower channel, an outboard manual drive assembly, a central lower channel, and a power drive assembly. The inboard lower channel is adapted to extend longitudinally along a floor of the vehicle. The inboard manual drive assembly is coupled to the seat assembly and slidably coupled to the inboard lower channel. The outboard lower channel is adapted to extend longitudinally along the floor of the vehicle. The outboard manual drive assembly is coupled to the seat assembly and slidably coupled to the outboard lower channel. The central lower channel is adapted to extend longitudinally along the floor of the vehicle. The power drive assembly is coupled to the seat assembly and slidably coupled to the central lower channel. The power drive assembly power drives the seat assembly along the central lower channel.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

Figure 1:
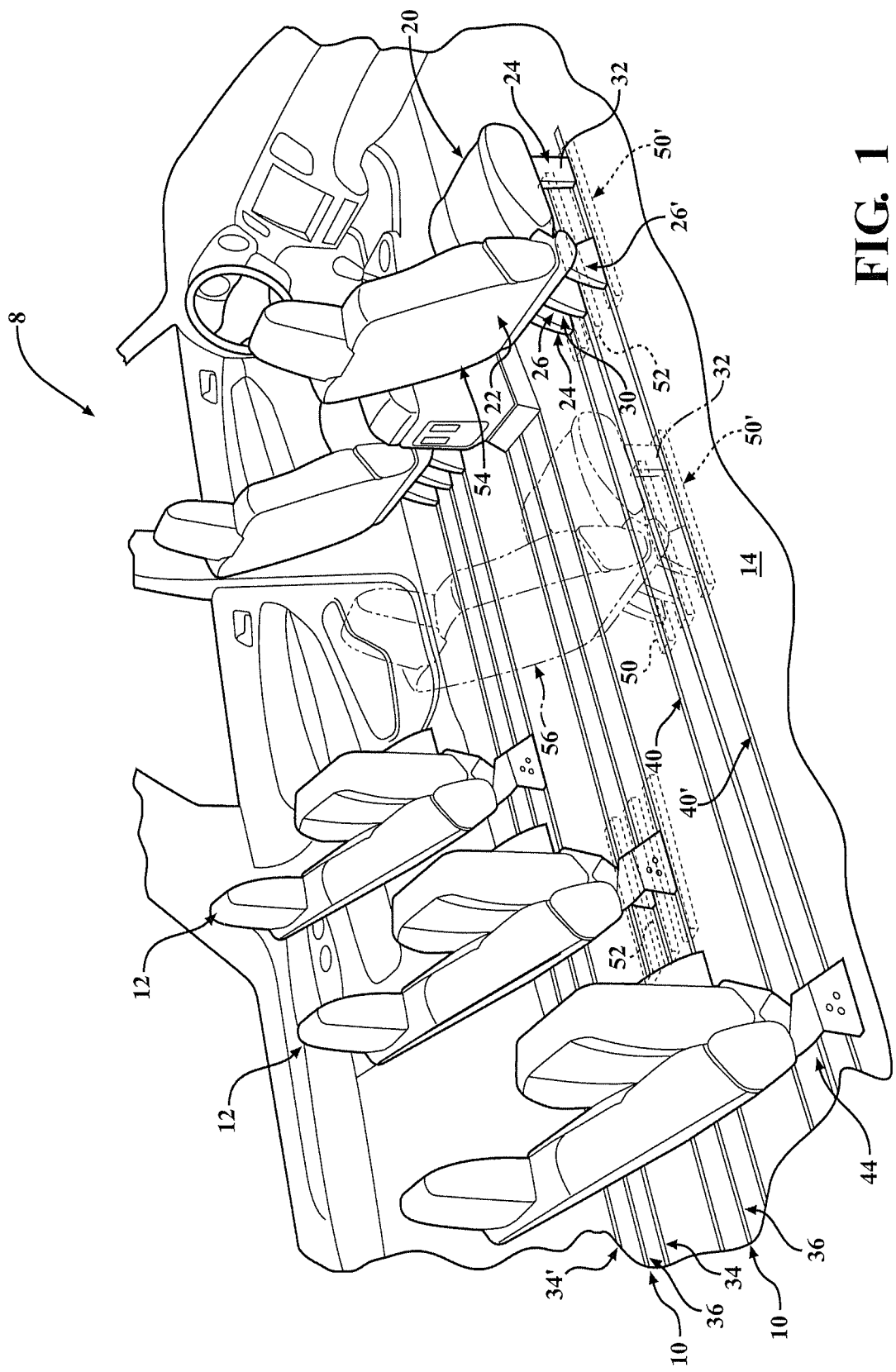
FIG. 1 is a fragmentary perspective view of a vehicle interior including seat assemblies and long rail assemblies according to one embodiment of the present invention.
Figure 2:
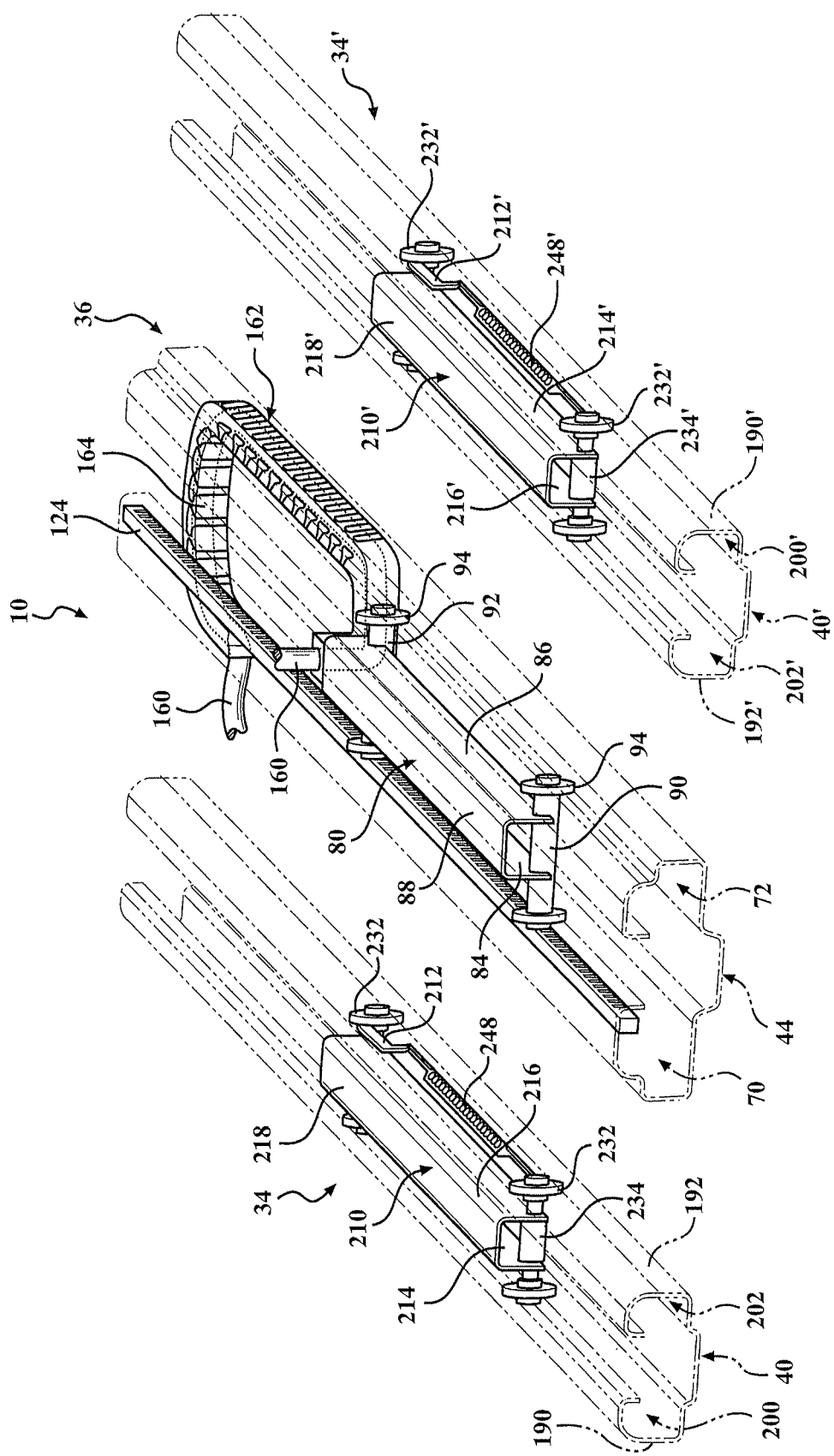
FIG. 2 is a partially transparent perspective view of a long rail assembly according to one embodiment of the present invention.

FIG. 1 illustrates an interior 8 of a vehicle with a plurality of long rail assemblies 10 configured to reposition a plurality of seat assemblies 12 along a floor 14 of the vehicle according to embodiments described herein. Each seat assembly 12 includes a seat cushion 20 and a seat back 22 operatively coupled to the seat cushion 20 for supporting a seat occupant in a generally upright seating position. Each seat assembly 12 also includes a mounting structure 24 that supports the seat cushion 20 above the vehicle floor 14. The mounting structure 24 includes an inboard rear leg 26, an outboard rear leg 26', a central rear leg 30 and may also include front legs 32.

Each long rail assembly 10 includes an inboard manual long rail assembly 34, an outboard manual long rail assembly 34' and a central power long rail assembly 36. The inboard manual long rail assembly 34 includes an inboard U-shaped lower channel 40 and an inboard manual drive assembly 50 slidably coupled to the inboard lower channel 40. Likewise, the outboard manual long rail assembly 34' includes an outboard U-shaped lower channel 40' and an outboard manual drive assembly 50' slidably coupled to the outboard lower channel 40'. The central power long rail assembly 36 includes a central U-shaped lower channel 44 and a power drive assembly 52 slidably coupled to the central lower channel 44. The lower channels 40, 40', 44 are adapted to be fixedly secured to the vehicle floor 14. The inboard and outboard rear legs 26, 26' are adapted to be fixedly attached to the manual drive assemblies 50, 50' and the central rear leg 30 is adapted to be fixedly attached to the power drive assembly 52. Alternatively, the rear legs 26, 26' may be releasably attached to the manual drive assemblies 50, 50' and the central rear leg 30 may be releasably attached to the power drive assembly 52. The seat assembly 12 may be adjusted among a plurality of fore/aft seating positions along the vehicle floor 14. For example, the seat assembly 12 may be repositioned from a first seat location 54 to a second seat location 56 by power driving the power drive assembly 52 along the central lower channel 44. Although described in terms of the components for the inboard manual long rail assembly 34, the present invention includes corresponding structures on the outboard manual long rail assembly 34' represented by like primed reference numerals. Additional details regarding long rail assemblies for use in automotive vehicles are fully set forth in Applicant's co-pending application no. PCT/US20/22908, entitled "Long Rail Assembly with Internal Power Driving System," filed Mar. 16, 2020, and co-pending application no. PCT/US19/55835, entitled "Long Rail Assembly for Vehicle Seat Adjustment," filed Oct. 11, 2019, the disclosures of which are hereby incorporated by reference in their entirety.

Referring to FIGS. 2, 5, 6 and 7, the central lower channel 44 includes opposing sidewalls 60, 62, a top wall 64 and a bottom wall 66 extending between the opposing sidewalls 60, 62. The top wall 64 includes an elongated opening 68 extending in a longitudinal direction. Each sidewall 60, 62 of the central lower channel 44 is bent into a C-shaped cross-section in profile to form tracks 70, 72 respectively. The bottom wall 66 of the central lower channel 44 is configured to be fixedly attached to the vehicle floor 14.

The power drive assembly 52 includes an inverted U-shaped central upper channel 80 slidably coupled to the central lower channel 44. The central upper channel 80 includes a pair of opposing sidewalls 84, 86 and a top wall 88 extending therebetween. The power drive assembly 52 also includes front and rear axles 90, 92 operatively coupled to the sidewalls 84, 86 of the central upper channel 80 and opposing rollers 94 that are coupled to the respective opposite ends of each axle 90, 92. The rollers 94 are configured to travel along the tracks 70, 72 of the central lower channel 44.

Figure 5:
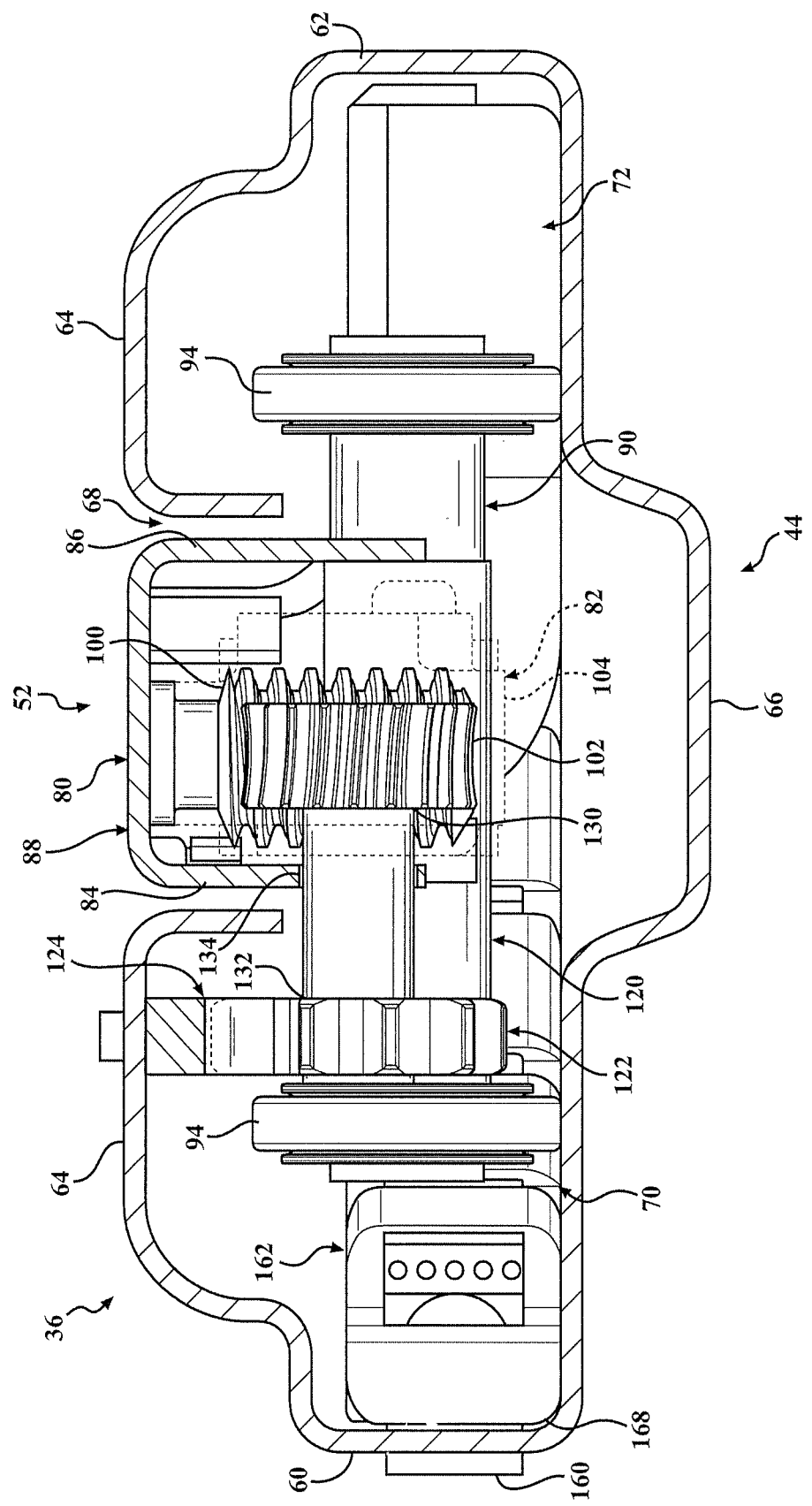
FIG. 5 is a partially transparent cross-sectional end view of a power long rail assembly according to one embodiment of the present invention.
Figure 6:
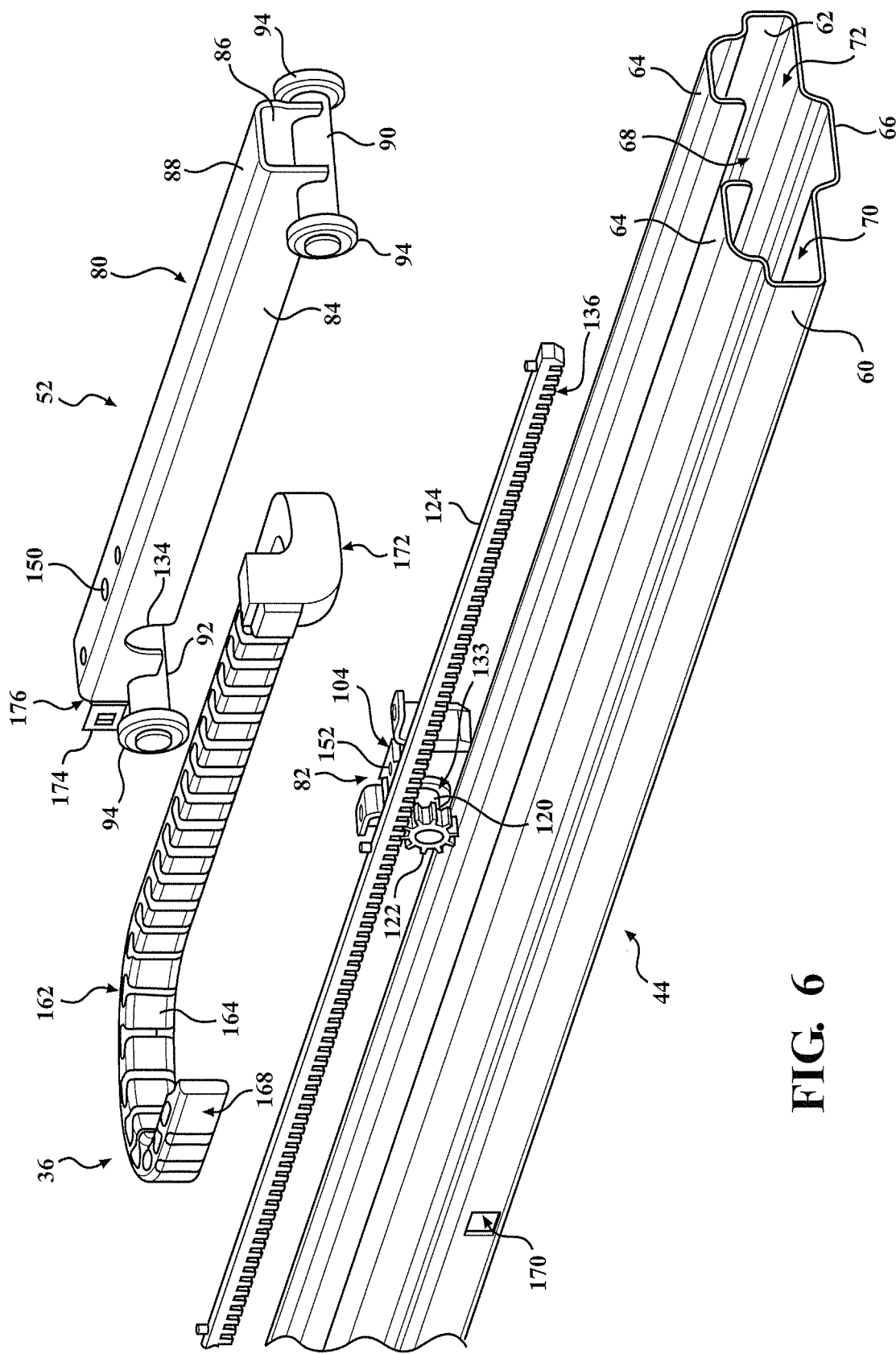
FIG. 6 is an exploded perspective view of the power long rail assembly of FIG. 5.
Figure 7:
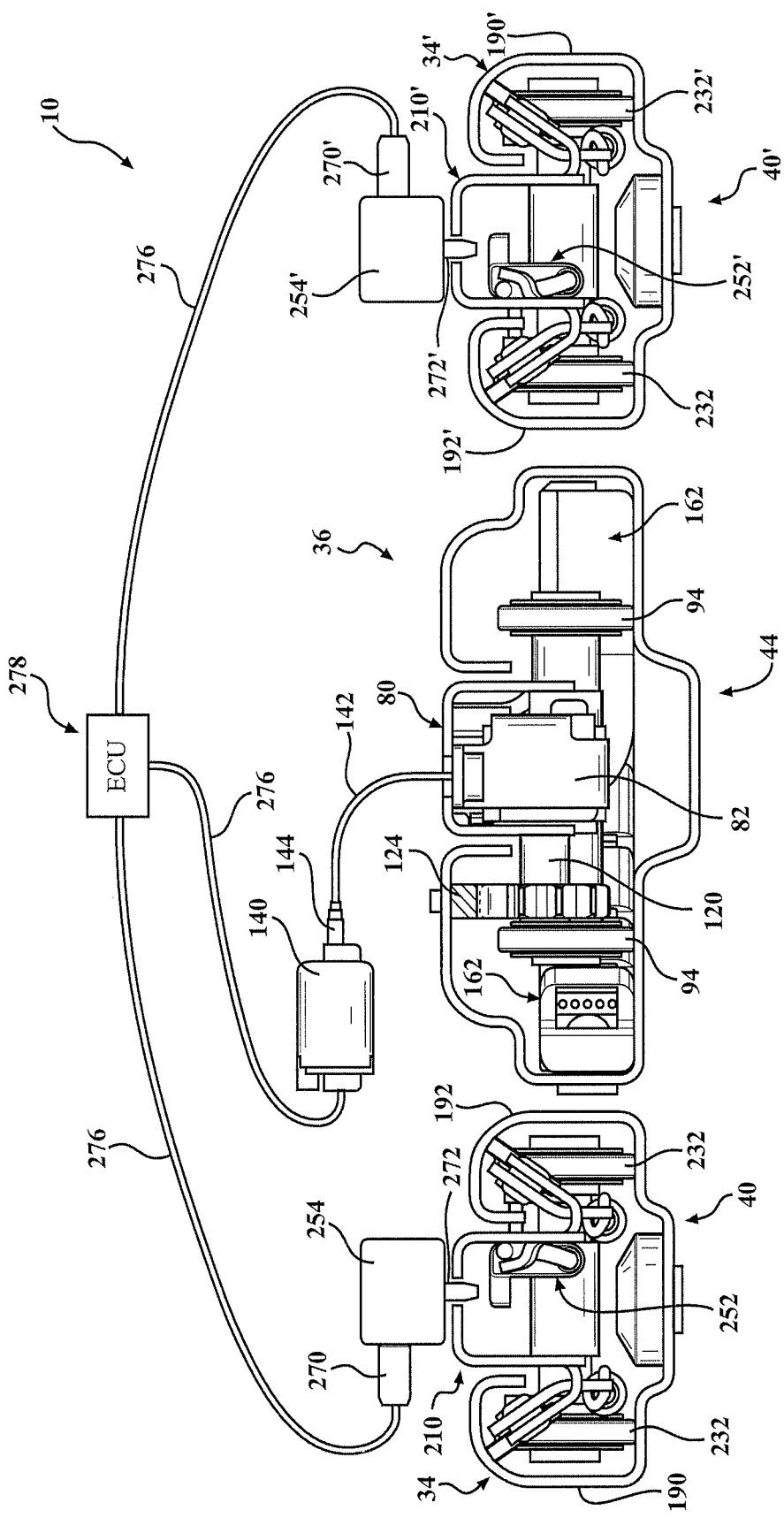
FIG. 7 is a cross-sectional end view of the long rail assembly according to one embodiment of the present invention.

Referring to FIGS. 5, 6, and 7, the power drive assembly 52 further includes a gearbox 82 fixedly secured to and housed within the central upper channel 80. Preferably, the gearbox 82 is mounted to the top wall 88 of the central upper channel 80. The gearbox 82 includes a vertically oriented worm gear 100 meshingly engaged with a worm wheel 102, both of which are rotationally supported within a gearbox housing 104.

The power drive assembly 52 also includes a drive shaft 120 and a pinion 122. A first end 130 of the drive shaft 120 is fixedly coupled to the worm wheel 102, and an opposite second end 132 of the drive shaft 120 is fixedly coupled to the pinion 122. The drive shaft 120 extends out of an opening 133 in the gearbox housing 104 and through a notch 134 in the sidewall 84 of the central upper channel 80.

The central power long rail assembly 36 further includes a rack 124 fixedly coupled to the top wall 64 of the central lower channel 44. The rack 124 includes a plurality of generally equally spaced apart gear teeth 136 extending along the length of the rack 124 in a longitudinal direction. The gear teeth 136 are oriented towards or facing the bottom wall 66 of the central lower channel 44. The pinion 122 is oriented in a vertical position to meshingly engage with the gear teeth 136 of the rack 124.

The gearbox 82, the rack 124 and pinion 122, are packaged inside the central power long rail assembly 36 to conceal it from any dirt and debris that may accumulate on the vehicle floor 14. In particular, because the gearbox 82 is mounted within the central upper channel 80, the upper channel 80 will prevent any dirt or debris from falling directly into gearbox 82. Similarly, because the rack 124 is mounted within the central lower channel 44 and the gear teeth 136 of the rack 124 are facing downward, any dirt or debris that enters the central lower channel 44 will not settle on the gear teeth 136. Moreover, because the gearbox 82, the rack 124 and the pinion 122 are elevated above the bottom wall 66 of the central lower channel 44, they are not likely to collect any dirt or debris that may accumulate in the central lower channel 44.

Referring to FIG. 7 the long rail assembly 10 further includes an electric motor 140. A flexible shaft 142 operatively couples an output shaft 144 of the motor 140 to the worm gear 100. The flexible shaft 142 extends from the output shaft 144 through an opening 150 in the top wall 88 of the central upper channel 80 and an opening 152 in the gearbox housing 104 to the worm gear 100. The motor 140 may be mounted anywhere on the seat assembly 12. For example, the motor 140 may be mounted to the bottom of the seat cushion 20.

Referring to FIGS. 2, 5, 6, and 7, the central power long rail assembly 36 further includes a cable 160 housed within a cable carrier 162 within the central lower channel 44. Because the central lower channel 44 accommodates the cable 160 within the cable carrier 162, the central lower channel 44 has a wider cross-section than the cross section of the inboard lower channel 40. The cable carrier 162 includes a plurality of hollowed out segments 164. Each segment 164 of the cable carrier 162 is flexibly coupled to an adjacent segment 164 to allow the segments 164 to flex and fold relative to one another as the central upper channel 80 slides along the central lower channel 44. The cable carrier 162 has a first end 168 that is fixedly attached to the sidewall 60 of the central lower channel 44. A bracket 174 fixedly attaches a second opposite end 172 of the cable carrier 162 to a back end 176 of the sidewall 84 of the central upper channel 80. The cable 160 enters the cable carrier 162 from the vehicle floor 14 through an opening 170 in the sidewall 60 of the central lower channel 44. The cable 160 provides power to the motor 140 and the seat assembly 12, and transmits data between the vehicle and the seat assembly 12.

Referring to FIGS. 2, 3, 4 and 7, the inboard lower channel 40 includes opposing sidewalls 190, 192, a top wall 194 and a bottom wall 196 extending between the opposing sidewalls 190, 192. The top wall 194 includes an elongated opening 198 extending in a longitudinal direction. Adjustment notches 268 extend downwardly from the top wall 194 at the opening 198. Each sidewall 190, 192 of the inboard lower channel 40 is bent into a C-shaped cross-section in profile to form tracks 200, 202 respectively. The bottom wall 196 of the inboard lower channel 40 is configured to be fixedly attached to the vehicle floor 14.

The inboard manual drive assembly 50 includes an inverted U-shaped inboard upper channel 210 slidably coupled to the inboard lower channel 40. The inboard upper channel 210 includes a pair of opposing sidewalls 214, 216 and a top wall 218 extending therebetween. A portion of the sidewall 214 of the inboard upper channel 210 is bent upward to form an outer channel wall 220 spaced apart from the sidewall 214 and defines a generally U-shaped channel 222 therebetween. A plurality of generally inverted U-shaped slots 224, are arranged in the sidewall 214 of the inboard upper channel 210 and spaced apart in the longitudinal direction of the inboard upper channel 210. Generally vertical notches 226 are spaced along the outer channel wall 220 and laterally aligned with the U-shaped slots 224 in the sidewall 214.

The inboard manual drive assembly 50 also includes stability rollers 212 projecting from the sidewalls 214, 216 of the inboard upper channel 210 and an extension spring 248 to bias the stability rollers 212 against the respective sidewalls 190, 192 of the inboard lower channel 40. The stability rollers 212 may project from the sidewalls 214, 216 at an angle to counteract both vertical and lateral tolerance variations between the inboard upper channel 210 and the inboard lower channel 40 within the inboard manual long rail assembly 34.

The inboard manual drive assembly 50 further includes front and rear axles 228, 230 operatively coupled to the sidewalls 214, 216 of the inboard upper channel 210 and opposing structural wheels 232 that are coupled to the opposite respective ends of each axle 228, 230. The structural wheels 232 support the seat assembly 12 and the inboard upper channel 210 as they slide along the inboard lower channel 40. A central portion 234 of each axle 228, 230 is slightly larger in diameter than the rest of the axle 228, 230. The larger central portion 234 assures that the axles 228, 230 are properly centered and stable relative to the inboard upper channel 210. The structural wheels 232 are configured to travel along the tracks 200, 202 of the inboard lower channel 40.

Figure 3:
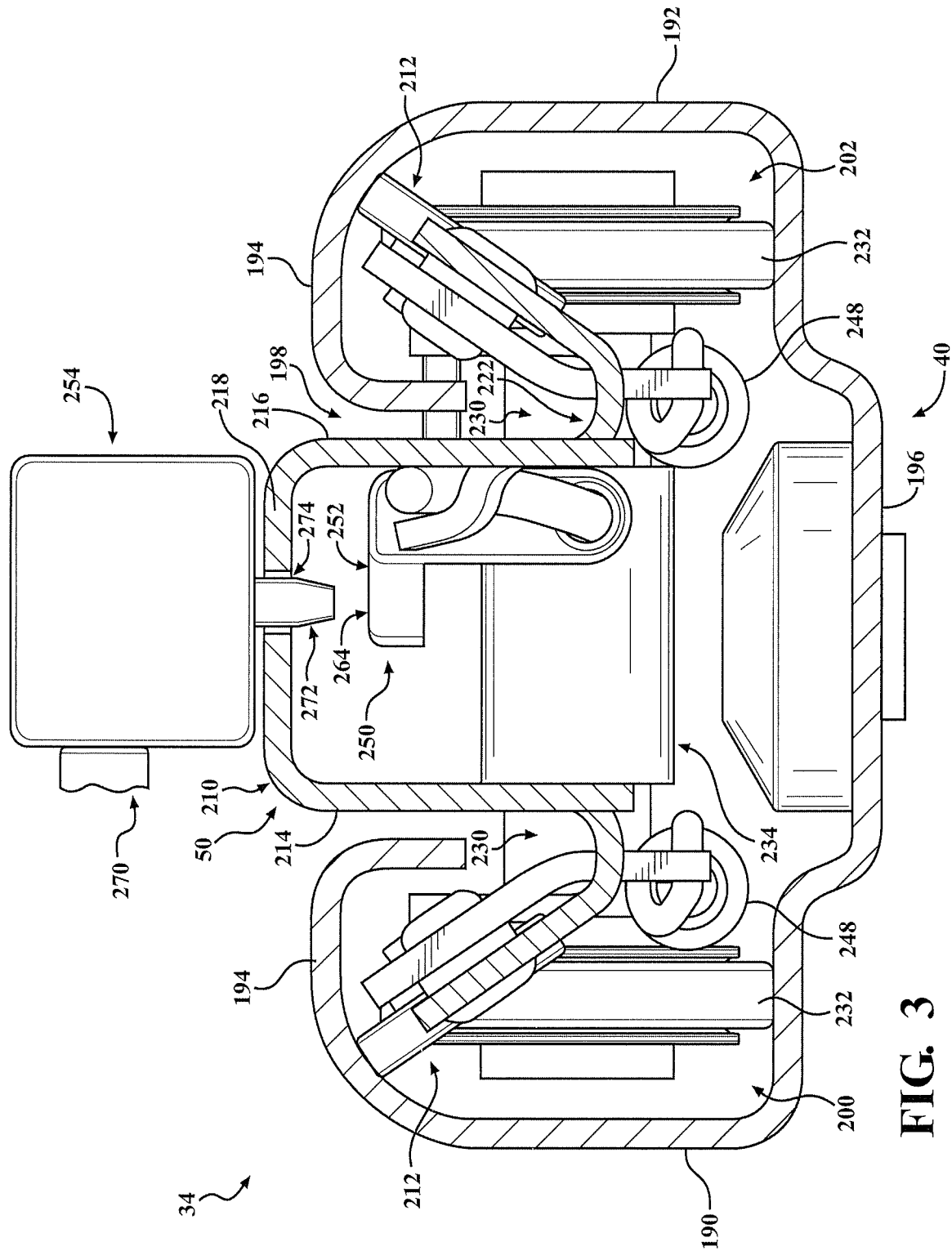
FIG. 3 is a cross-sectional end view of a manual long rail assembly according to one embodiment of the present invention.
Figure 4:
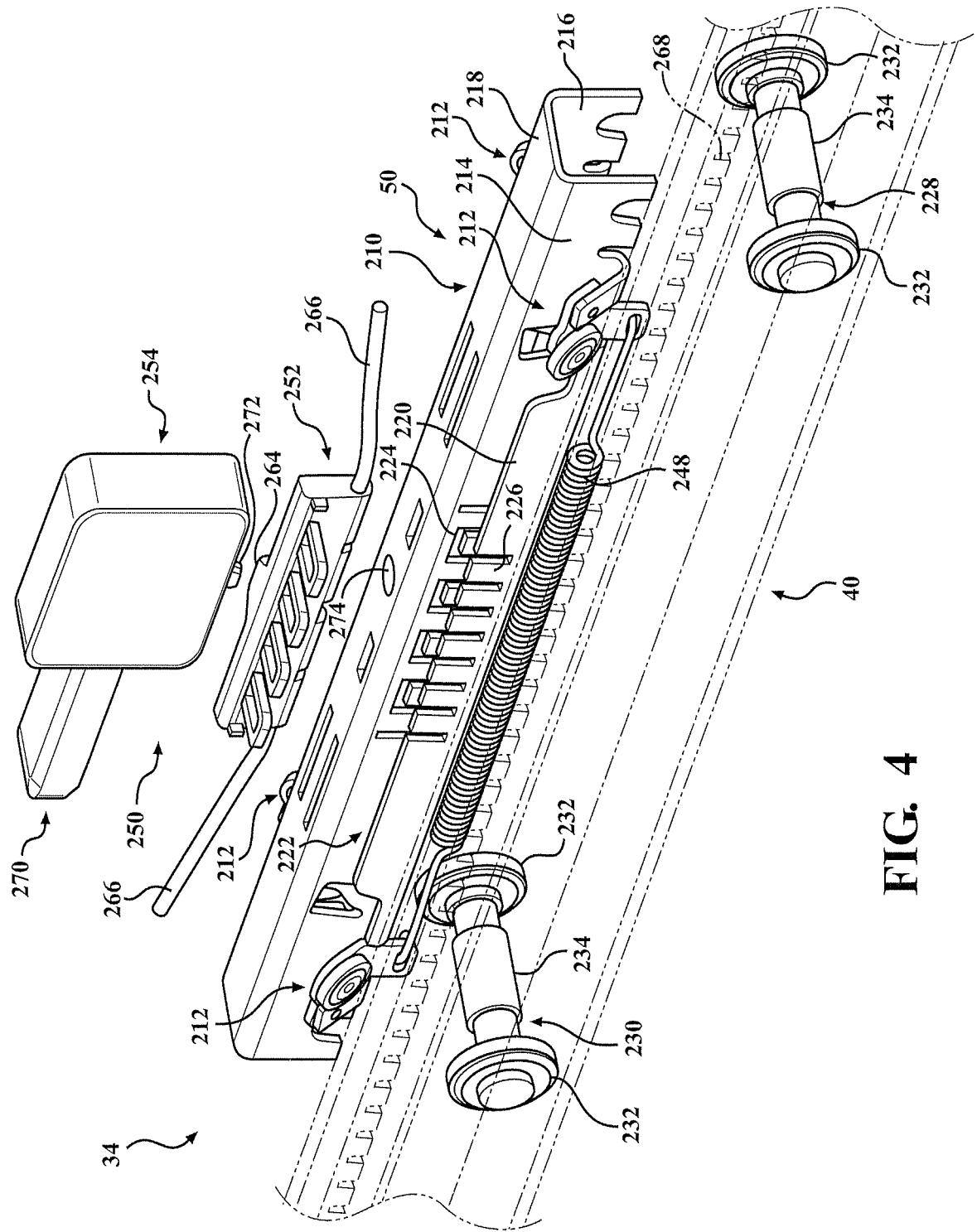
FIG. 4 is an exploded perspective view of the manual long rail assembly of FIG. 3.

Referring to FIGS. 3, 4 and 7, the inboard manual long rail assembly 34 includes a loop latch system 250 to releasably couple the inboard manual drive assembly 50 to the inboard lower channel 40. The loop latch system 250 includes a loop latch 252 and a latch release mechanism 254. The loop latch 252 includes a release trigger 264 and a spring 266. The spring 266 biases the loop latch 252 into a locked position, thereby preventing the inboard manual drive assembly 50 from sliding along the inboard lower channel 40. A downward force on the release trigger 264 actuates the loop latch 252 into an unlocked position and unlocks the inboard manual drive assembly 50 from the inboard lower channel 40, thus allowing the inboard manual drive assembly 50 to slide along the inboard lower channel 40.

The latch release mechanism 254 includes a latch motor 270 and a plunger 272 operatively coupled to the latch motor 270. The plunger 272 extends through an opening 274 in the top wall 218 of the inboard upper channel 210, and is generally vertically aligned with the release trigger 264 of the loop latch 252 for selectively engaging the release trigger 264 and actuating the loop latch 252 between the locked and unlocked positions. Additional details regarding the loop latch system 250 for use in a long rail assembly are fully set forth in Applicant's co-pending application no. PCT/US19/66701, entitled "Loop Latch Release For Power Long Rail Assembly," filed Dec. 17, 2019, the disclosure of which is hereby incorporated by reference in its entirety.

Referring to FIG. 7, the long rail assembly 10 further includes an electronic control unit ("ECU") 278 operatively coupled to the latch motors 270, 270' and the motor 140. The ECU 278 may be coupled to the latch motors 270, 270' and/or the motor 140 via an electrical cable 276. Alternatively, the ECU 278 may be wirelessly connected to the latch motors 270, 270' and/or the motor 140.

In operation, the ECU 278 initially actuates the latch motors 270, 270' to cause the plungers 272, 272' to unlock the loop latches 252, 252' on the manual long rail assemblies 34, 34'. Once unlocked, the manual drive assemblies 50, 50' are able to slide along the inboard/outboard lower channels 40, 40'. The ECU 278 then actuates the motor 140. The rotation of output shaft 144 of the motor 140 rotates the flexible shaft 142 causing the worm gear 100 to rotate. Rotation of the worm gear 100 is transferred to the worm wheel 102 through their meshing engagement. The drive shaft 120 transfers the rotation of the worm wheel 102 to the pinion 122. The rotation of the pinion 122 along the rack 124 transposes the central upper channel 80 along the central lower channel 44, thereby moving the seat assembly 12 along the long rail assembly 10 in a first direction. Reversing the rotational direction of the motor 140 results in the pinion 122 rotating in an opposite direction along the rack 124, thus moving the central upper channel 80, and the corresponding seat assembly 12, along the central lower channel 44 in an opposite direction. After the seat assembly 12 reaches the desired location along the vehicle floor 14, the ECU 278 deactivates the motor 140 to stop movement of the seat assembly 12. The ECU 278 then actuates the latch motors 270, 270' to cause the plungers 272, 272' to release the loop latches 252, 252' and lock the manual drive assemblies 50, 50' onto the inboard/outboard lower channels 40, 40'. Pulse width modulation of the motor 140 may provide a more comfortable adjustment speed when the seat assembly 12 is occupied, and a quicker adjustment speed when the seat assembly 12 is unoccupied.

The present invention removes the power drive functionality from the inboard and outboard drive assemblies 50, 50' and consolidates them into one central power drive assembly 52. Reducing the number of power drive assemblies 52 required for each seat assembly 12 not only reduces costs, but it also reduces the number of mechanical parts required, and thus reduces the chances that the system will succumb to mechanical failure. In addition, when two independent power drive assemblies are required to drive a seat assembly 12, the two assemblies must be synchronized in order for the system to work properly. Therefore, the present invention eliminates the need to synchronize multiple power drive assemblies.

The present invention also allows for the optimization of the long rail assembly 10. By separating the power drive functionality, the present invention allows the central power long rail assembly 36 to be optimized for packaging the electrical and power components. Likewise, the manual long rail assemblies 34, 34', which take all of the load from the seat assembly 12 and the occupant, are no longer hindered by the space requirements needed for the power drive assembly 52 components, and may be better optimized for strength and stability to absorb the variation from the seat structure and road input.

Finally, separating the power drive functionality facilitates the maintenance and repair of the long rail assemblies 10 because any problems in the power drive system may be addressed by replacing or repairing a single central power drive assembly 52 without having to replace or maintain any of the components from the manual drive assemblies 50, 50'. Finally, the present invention facilitates the transition from a power-driven system to a manual system by simply removing the central power long rail assembly 36.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A long rail assembly for repositioning a seat assembly in a vehicle comprising:
   an inboard lower channel adapted to extend longitudinally along a floor of the vehicle;
   an inboard manual drive assembly configured to be coupled to the seat assembly and slidably coupled to the inboard lower channel;
   an outboard lower channel adapted to extend longitudinally along the floor of the vehicle;
   an outboard manual drive assembly configured to be coupled to the seat assembly and slidably coupled to the outboard lower channel;
   a central lower channel adapted to extend longitudinally along the floor of the vehicle;
   a power drive assembly configured to be coupled to the seat assembly, the power drive assembly comprising:
   a central upper channel slidably coupled to the central lower channel; and a gearbox coupled to the central upper channel, wherein the power drive assembly power drives the seat assembly along the central lower channel to selectively reposition the seat assembly in the vehicle;

a rack fixedly coupled to the central lower channel, wherein the rack includes gear teeth extending along the rack in a longitudinal direction;

a pinion meshingly engaged with the gear teeth;

a drive shaft operatively coupling the gearbox to the pinion; and a motor operatively coupled to the gearbox.

2. The long rail assembly as set forth in claim 1 wherein rotational output from the motor leads to transpositional rotation of the pinion along the rack to slide the central upper channel along the central lower channel.

3. The long rail assembly as set forth in claim 2 wherein:
the inboard manual drive assembly comprises an inboard upper channel slidably coupled to the inboard lower channel and an inboard loop latch system that releasably couples the inboard upper channel to the inboard lower channel; and
the outboard manual drive assembly comprises an outboard upper channel slidably coupled to the outboard lower channel and an outboard loop latch system that releasably couples the outboard upper channel to the outboard lower channel.

4. The long rail assembly as set forth in claim 3 wherein:
the inboard manual drive assembly further comprises an inboard latch release mechanism to actuate the inboard loop latch system and uncouple the inboard upper channel from the inboard lower channel; and
the outboard manual drive assembly further comprises an outboard latch release mechanism to actuate the outboard loop latch system and uncouple the outboard upper channel from the outboard lower channel.

5. The long rail assembly as set forth in claim 4 further comprising an electronic control unit to activate the inboard latch release mechanism, the outboard latch release mechanism, and the power drive assembly.

6. The long rail assembly as set forth in claim 5 wherein:
the inboard lower channel includes opposing sidewalls, a bottom wall and a top wall extending between the opposing sidewalls, wherein the top wall has an elongated opening extending in a longitudinal direction;
the inboard upper channel includes opposing sidewalls and a top wall extending between the opposing sidewalls;
the outboard lower channel includes opposing sidewalls, a bottom wall and a top wall extending between the opposing sidewalls, wherein the top wall has an elongated opening extending in a longitudinal direction; and
the outboard upper channel includes opposing sidewalls and a top wall extending between the opposing sidewalls;
wherein the inboard manual drive assembly further comprises a plurality of inboard stability rollers projecting from the sidewalls of the inboard upper channel towards the sidewalls of the inboard lower channel, and the outboard manual drive assembly further comprises a plurality of outboard stability rollers projecting from the sidewalls of the outboard upper channel towards the sidewalls of the outboard lower channel.

7. The long rail assembly as set forth in claim 6 wherein the inboard manual drive assembly further comprises a plurality of inboard structural wheels to support the seat assembly and the inboard upper channel along the inboard lower channel, and the outboard manual drive assembly further comprises a plurality of outboard structural wheels to support the seat assembly and the outboard upper channel along the outboard lower channel.

8. The long rail assembly as set forth in claim 7 further comprising a cable carrier within the central lower channel and a cable housed within the cable carrier, wherein the cable provides power to the inboard latch release mechanism, the outboard latch release mechanism, and the power drive assembly.

9. The long rail assembly as set forth in claim 8 wherein the cable transmits data between the vehicle and the seat assembly.

10. The long rail assembly as set forth in claim 9 wherein the cable carrier comprises a plurality of segments wherein each of the plurality of segments is flexibly coupled to an adjacent one of the plurality of segments.

11. The long rail assembly as set forth in claim 10 wherein:
the central lower channel includes opposing sidewalls, a bottom wall and a top wall extending between the opposing sidewalls, wherein the top wall has an elongated opening extending in a longitudinal direction;
the central upper channel includes opposing sidewalls and a top wall extending between the opposing sidewalls; and
a first end of the cable carrier is coupled to one of the opposing sidewalls of the central lower channel and a second end of the cable carrier is coupled to a bracket that is fixedly attached to one of the opposing sidewalls of the central upper channel.

12. The long rail assembly as set forth in claim 11 wherein the rack is fixedly coupled to the top wall of the central lower channel and the gear teeth are oriented toward the bottom wall of the central lower channel.

13. The long rail assembly as set forth in claim 12 wherein the gearbox is fixedly secured to and housed within the central upper channel.

14. The long rail assembly as set forth in claim 13 wherein the gearbox comprises a worm wheel and a worm gear housed within a housing, wherein the worm wheel is meshingly engaged with the worm gear.

15. The long rail assembly as set forth in claim 14 wherein the drive shaft operatively couples the worm wheel to the pinion.

16. The long rail assembly as set forth in claim 15 further comprising a flexible drive shaft operatively coupling the motor to the gearbox.

* * * * *